United States Patent
Thomas et al.

(10) Patent No.: US 9,235,727 B2
(45) Date of Patent: Jan. 12, 2016

(54) FUNCTIONAL ARCHITECTURE PATTERN FOR SAFETY APPLICATIONS

(71) Applicant: DANA BELGIUM N.V., Sint-Michiels (BE)

(72) Inventors: Christophe Thomas, Drongen (BE); Steven Dumoulin, Roeselare (BE); Bjorn Aelvoet, Lovendegem (BE)

(73) Assignee: Dana Belgium N.V., Bruges (BE)

( * ) Notice: Subject to any disclaimer, the term of this patent is extended or adjusted under 35 U.S.C. 154(b) by 0 days.

(21) Appl. No.: 13/261,967

(22) PCT Filed: Apr. 9, 2013

(86) PCT No.: PCT/EP2013/057385
§ 371 (c)(1),
(2) Date: Oct. 8, 2014

(87) PCT Pub. No.: WO2013/153060
PCT Pub. Date: Oct. 17, 2013

(65) Prior Publication Data
US 2015/0143332 A1     May 21, 2015

Related U.S. Application Data

(60) Provisional application No. 61/621,656, filed on Apr. 9, 2012, provisional application No. 61/663,282, filed on Jun. 22, 2012.

(51) Int. Cl.
*G06F 9/44*     (2006.01)
*G06F 21/62*     (2013.01)
*G06F 21/74*     (2013.01)
*G06F 9/54*     (2006.01)

(52) U.S. Cl.
CPC .............. *G06F 21/6236* (2013.01); *G06F 8/10* (2013.01); *G06F 8/70* (2013.01); *G06F 9/54* (2013.01); *G06F 21/74* (2013.01)

(58) Field of Classification Search
IPC ... G06F 21/74,8/10, 9/54, 21/6236; H02H 3/00, H02H 3/14
See application file for complete search history.

(56) References Cited

U.S. PATENT DOCUMENTS

| | | | |
|---|---|---|---|
| 7,813,820 B2 | 10/2010 | Opem et al. | |
| 8,180,466 B2 | 5/2012 | Longsdorf et al. | |
| 8,781,882 B1 * | 7/2014 | Arboletti | G06Q 10/0639 705/7.11 |

(Continued)

OTHER PUBLICATIONS

Andrea Piovesan and John Favaro; Experience with ISO 26262 ASIL Decomposition; Automotive SPIN; Feb. 17, 2011, pp. 1-27; Milano, Italy.

*Primary Examiner* — Tuan Vu
(74) *Attorney, Agent, or Firm* — Marshall & Melhorn, LLC (57) ABSTRACT

A process for decomposing safety software involves the steps of providing a first software module associated with a first logical unit, providing a second software module associated with a second logical unit, instructing the first software module to implement a first safety goal based on a quality management level, and instructing the second software module to implement a second safety goal based on a safety integrity level, where the second software module uses at least one input and at least one output of the second logical unit to determine if the second safety goal is satisfied. Consequently, the second software module uses a result of the first software module to determine if the first safety goal has been completed, and the second software module uses at least one algorithm to verify an operational status of the first logical unit.

2 Claims, 10 Drawing Sheets

(56) References Cited

U.S. PATENT DOCUMENTS

| | | | |
|---|---|---|---|
| 2008/0209211 A1* | 8/2008 | Grgic | G06F 21/6236 713/166 |
| 2009/0228118 A1 | 9/2009 | Von Schwertfuehrer et al. | |
| 2012/0137160 A1 | 5/2012 | Larsson | |
| 2015/0124363 A1* | 5/2015 | Garbossa | H02H 3/20 361/86 |
| 2015/0242233 A1* | 8/2015 | Brewerton | G06F 9/45558 710/308 |

* cited by examiner

User-Level Registers

General-Purpose Registers

```
   0        31 32        63
(upper)  GPR0¹  (lower)
         GPR1              General
         GPR2              purpose
         ...               registers
         GPR31
```

L1 Cache (Read Only)
spr 515  L1CFG0³    L1 cache configuration register 0

Instruction-Accessible Registers

```
                31 32        63
spr 9           CR              Condition reg.
spr 8           CTR             Count register
spr 1           LR              Link register
                XER             Integer excp. reg.
spr 512         SPEFSCR³        SP/embedded FP status/contl. reg.
                ACC³            Accumulator
```

User General SPR (Read/Write)

```
                32        63
spr 256         USPRG0²         User SPR general 0
```

General SPRs (Read-Only)

```
spr 260    SPRG4
spr 261    SPRG5          SPR general
spr 262    SPRG6          registers 4-7
spr 263    SPRG7
```

Time-Base Registers (Read-Only)

```
spr 288    TBL    Time base
spr 289    TBU    lower/upper
```

[1] The 64-bit GPR registers are accessed by the SPE as separate 32 bit registers by SPE instructions. Only SPE vector instructions can access the upper-word.
[2] USPRG0 is a separate physical register from SPRG0.
[3] EIS-specific registers; not part of the Book E architecture.

FIG. 3

Supervisor-Level Registers

Interrupt Registers

| | 32 | 63 | |
|---|---|---|---|
| spr | 63 | IVPR | Intrupt. vect. prefix reg. |
| spr | 26 | SRR0 | Save/restore |
| spr | 27 | SRR1 | registers 0/1 |
| spr | 58 | CSRR0 | Critical SRR 0/1 |
| spr | 59 | CSRR1 | |
| spr | 574 | DSRR0[3] | Debug interrupt |
| spr | 575 | DSRR1[3] | SRR0/1 |
| spr | 62 | ESR | Except. syndrome register |
| spr | 572 | MCSR[3] | Machine check syndrome register |
| spr | 61 | DEAR | Data exception address register |

| | 32 | 63 | |
|---|---|---|---|
| spr | 400 | IVOR0 | Intrupt. vect. offset |
| spr | 401 | IVOR1 | registers 0-15[4] |
| spr | 415 | IVOR15 | |
| spr | 528 | IVOR32[3] | |
| spr | 529 | IVOR33[3] | Intrupt. vect. offset |
| spr | 530 | IVOR34[3] | registers 32-34 |

MMU Control and Status (Read/Write)

| | | | |
|---|---|---|---|
| spr | 1012 | MMUCSR0[3] | MMU contl. & |
| spr | 624 | MAS0[3] | status reg. 0 |
| spr | 625 | MAS1[3] | |
| spr | 626 | MAS2[3] | |
| spr | 627 | MAS3[3] | MMU asst. reg. |
| spr | 628 | MAS4[3] | 0-4 and 6 |
| spr | 630 | MAS6[3] | |
| spr | 48 | PID0 | Process ID register 0 |

Configuration Registers

| | 32 | 63 | |
|---|---|---|---|
| | | MSR | Mach. state reg. |
| spr | 1023 | SVR[3] | System version register |
| spr | 286 | PIR | Processor ID reg. |
| spr | 287 | PVR | Processor version register |

Timer/Decrementer Registers

| | 32 | 63 | |
|---|---|---|---|
| spr | 22 | DEC | Decrementer |
| spr | 54 | DECAR | Decrementer auto-reload reg. |
| spr | 284 | TBL | Time base lower/upper |
| spr | 285 | TBU | |
| spr | 340 | TCR | Time control reg. |
| spr | 336 | TSR | Time status reg. |

[4]IVOR9 (handles auxiliary processor unavailable interrupt) is defined by the EIS but not supported by the e200z6.

FIG. 3 (Continuing)

Supervisor-Level Registers

Interrupt Registers

Debug Registers

| | 32 | 63 | |
|---|---|---|---|
| spr 308 | DBCR0 | | |
| spr 309 | DBCR1 | | Debug control |
| spr 310 | DBCR2 | | register 0-3 |
| spr 561 | DBCR3 | | |
| spr 304 | DBSR | | Debug status reg. |
| spr 562 | DBCNT[5] | | Debug count reg. |
| spr 312 | IAC1 | | |
| spr 313 | IAC2 | | Instruction address |
| spr 314 | IAC3 | | compare |
| spr 315 | IAC4 | | register 1-4 |
| spr 316 | DAC1 | | Data address |
| spr 317 | DAC2 | | compare |
| | | | registers 1 and 2 |

MMU Control and Status (Read Only)

| | 32 | 63 | |
|---|---|---|---|
| spr 1015 | MMUCFG[3] | | MMU config. |
| spr 688 | TLB0CFG[3] | | TLB config. |
| spr 689 | TLB1CFG[3] | | 0/1 |

L1 Cache (Read/Write)

| | 32 | 63 | |
|---|---|---|---|
| spr 1010 | L1CSR0[3] | | L1 cache contl./ status reg. 0 |
| spr 1018 | L1FINV0[5] | | L1 cache flush/invalid. contl. register 0 |

Configuration Registers

Miscellaneous Registers

| | 32 | 63 | |
|---|---|---|---|
| spr 1008 | HID0[3] | | Hardware |
| spr 1009 | HID1[3] | | Implementation dependent 0-1 |
| spr 1013 | BUCSR[5] | | Branch control and status reg. |
| spr 272-279 | SPRG0-7 | | Gen. SPRs 0-7 |

Context Control (Read/Write)

| | | |
|---|---|---|
| spr 560 | CTXCR[5] | Context control register |
| spr 568 | ALTCTXCR[5] | Altern. context control register |

[5]e200z6 – specific registers

FIG. 3 (Continuing)

| Field | Description |
|---|---|
| V | Valid bit for entry |
| TS | Translation address space (compared with AS bit of the current access) |
| TID [0-7] | Translation ID (compared with PID0 or TIDZ (all zeros)) |
| EPN [0-19] | Translation ID (compared with PID0 or TIDZ (all zeros)) |
| RPN [0-19] | Real page number (translated address) |
| | Encoded page size |
| | 0000 Reserved |
| | 0001 4 Kbytes |
| | 0010 16 Kbytes |
| | 0011 64 Kbytes |
| SIZE [0-3] | 0100 256 Kbytes |
| | 0101 1 Mbytes |
| | 0110 4 Mbytes |
| | 0111 16 Mbytes |
| | 1000 64 Mbytes |
| | 1001 256 Mbytes |
| | All others --- reserved |
| PERMIS [0-5] | Supervisor execute, write, and read permission bits, and user execute, write, and read permission bits |
| WIMGE | Memory / cache attributes (write-through, cache-inhibit, memory Coherence required, guarded, endian) |
| U0-U3 | User attribute bitsNused only by software |
| IPROT | Invalidation protection |

FUNCTIONAL ARCHITECTURE PATTERN FOR SAFETY APPLICATIONS

RELATED APPLICATION

This application claims the benefit under 35 U.S.C. §119 (e) of U.S. Provisional Patent Application Ser. No. 61/621,656, filed Apr. 9, 2012 and U.S. Provisional Patent Application Ser. No. 61/663,282, filed Jun. 22, 2012, which are incorporated by reference herein in their entirety.

FIELD OF THE INVENTION

The present invention relates to a functional architecture pattern used in a process to decompose software. More particularly, the present invention relates to a functional architecture pattern used in a process to decompose safety software.

BACKGROUND OF THE INVENTION

Currently, governments and industries are imposing functional safety standards on a variety of entities, for example, the automotive industry. Usually, these functional safety standards are realized by way of safety software that utilizes standard functional architecture patterns. Unfortunately, these functional safety standards, software, and architecture patterns are very rigid and do not give OEMs or integrators enough flexibility to maintain or upgrade the functionality of the safety-related systems, without incurring considerable added costs to an overall system.

Specifically, functional safety standards require time consuming design and certified validation, where no integration with associated non-safety related applications exists. Hence, expensive hardware and software designs are required because the safety software and standard functional architecture patterns are dedicated. When upgrades are required to a non-safety related application, both the safety application and the associated non-safety related application must be recertified, thereby adding costs and loss of functional system time to an entity.

What is sought is a way to separate the safety related application from the associated non-safety related application, so that when the associated non-safety related application requires maintenance and upgrading, the safety related application does not have to be recertified. Thereby, saving an entity much time and labor costs.

SUMMARY OF THE INVENTION

A process for decomposing software comprises the steps of providing a first software module associated with a first logical unit, providing a second software module associated with a second logical unit, instructing the first software module to implement a first safety goal based on a quality management level, and instructing the second software module to implement a second safety goal based on a safety integrity level, wherein the second software module uses at least one input and at least one output of the second logical unit to determine if the second safety goal is satisfied. Consequently, the second software module uses a result of the first software module to determine if the first safety goal has been completed, and the second software module uses at least one algorithm to verify an operational status of the first logical unit.

Further objects and advantages of the present invention will be apparent from the following description and appended claims, reference being made to the accompanying drawings forming a part of a specification, wherein like reference characters designate corresponding parts of several views.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Table 1 lists some of the abbreviations used throughout the disclosure.

TABLE 1

Abbreviations

BSP: Board support packages
ECC: Error correction code
inet: Internet source
MMU: Memory management unit
MSR: Machine status register
PDF: Portable document format
PID: Process identifier
QM: Quality Management
RAM: Random Access Memory
RTOS: Real-time operating system
SG: Safety goal(s)
SRS: Sharepoint site
SW-C: Software component(s)
SW-S/A: Software sensor/actuator component(s)
TLB: Translation lookaside buffer
uC: Microcontroller Some of the advantages of the instant invention that will become apparent are the following. Design and validate are only required of a small part of the functional safety related application according to standards known as Safety Integrity Levels (SIL). Design and validation of major parts of the functional safety related application are achieved according to Quality Management (QM) levels. Non-safety related applications (design and validation according to QM level) are integrated with safety related applications. The design for all applications (safety related or not) is achieved with generic hardware/software. Hence, major parts of functional safety related applications are upgraded without re-certification.

Figure 1:
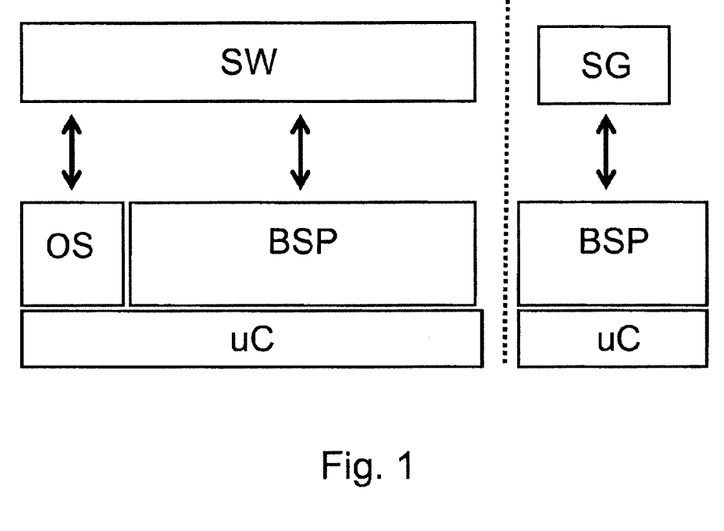
FIG. 1 is a block diagram of a first functional architecture in accordance with present invention.

FIG. 1 illustrates a first pattern (functional architecture) in accordance with the present invention that uses the following principles. As indicated by the dashed vertical line separating the SW and SG modules, an SIL decomposition is used to make a split-off between safety-related generic reusable software (called the SW module) and safety-related application specific software (called the SG module), wherein the SW and SG modules have their own separate logical unit (uC). Therefore, it is guaranteed that the SW cannot interfere (such as write code, write memory, and/or write data) with the SG.

Also, the SW implements safety goals in a generic functional way according to the QM level. Thereby, the SG implements safety goals in a dedicated application-specific way according to the SIL level on three levels.

Regarding safety-related function monitoring, the SG uses inputs and outputs of its logical unit in order to diagnose if the safety goals are still satisfied. Regarding safety-related application monitoring, the SG uses intermediate results of the SW in order to diagnose if the safety goals are satisfied. Regarding generic application monitoring, the SG uses a question-answer algorithm to check if the SW logical unit is working correctly.

To obtain these results, the following logical entities exist, uC (logical unit) modules are hardware, OS (operating system) module that is developed according to the SIL level, BSP (board support packages) modules that are also developed according to the SIL level, SW (software) module that is developed according to QM level, and SG module that is developed according to the SIL level.

Figure 2:
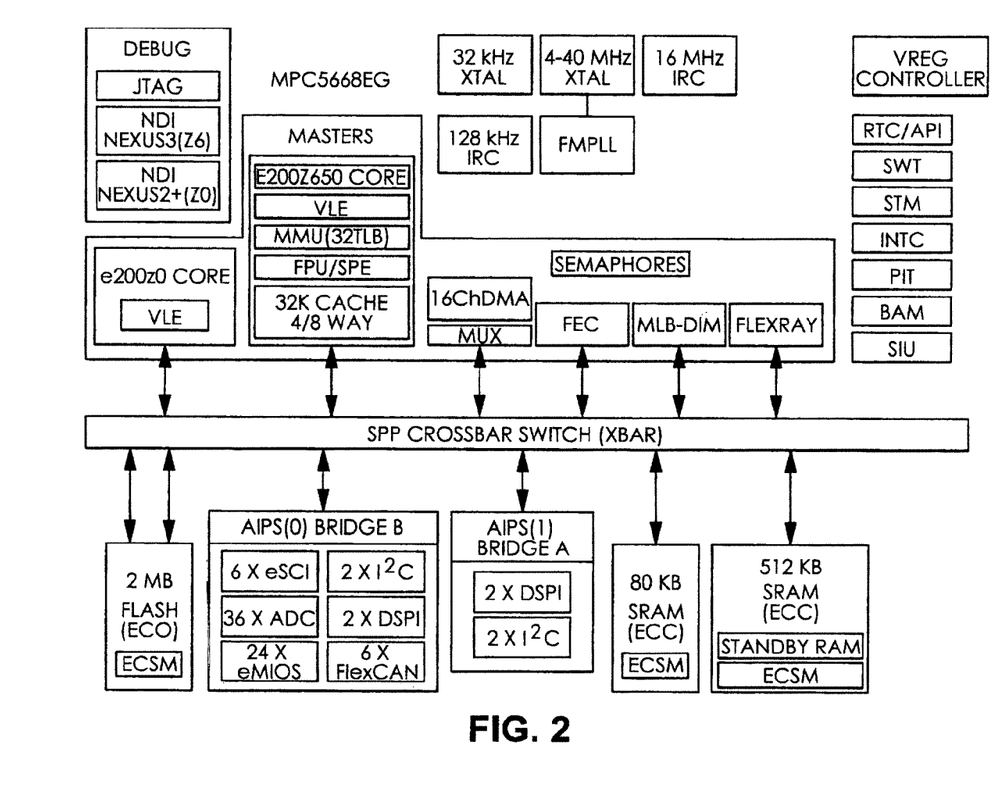
FIG. 2 is a block diagram of an MPC5668EG processor in accordance with the present invention.
Figure 8:
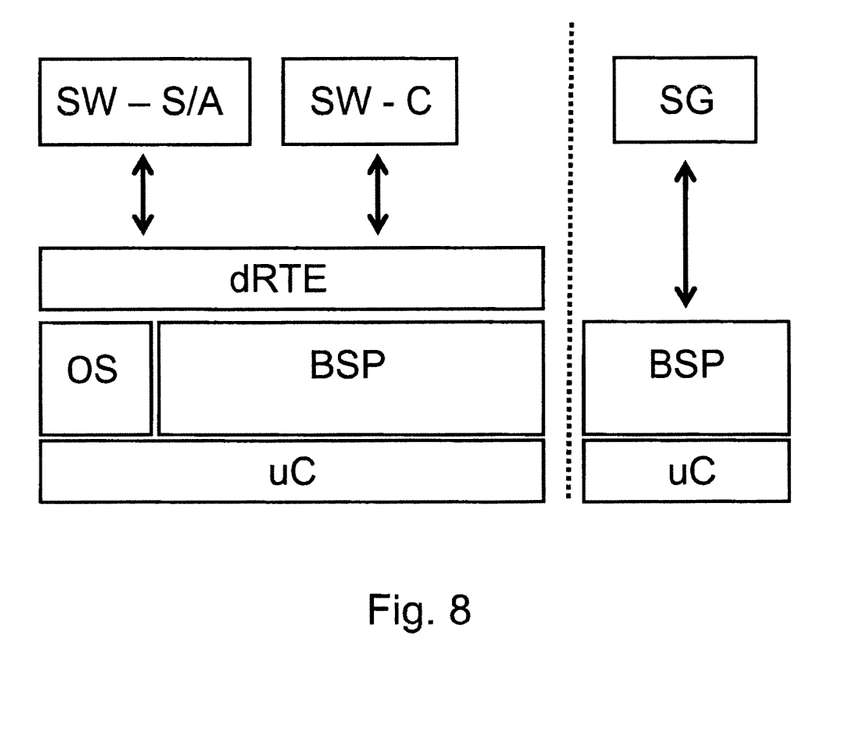
FIG. 8 is a block diagram of a second functional architecture in accordance with the present invention.

FIG. 2 illustrates the specifics for a global memory manager controller MPC5668EG implemented in both of the preferred embodiments that are respectively illustrated in FIGS. 1 and 8. In the supervisor mode/user mode, an e200z6 core (see MASTERS box in upper portion of FIG. 2) defines the following two levels of programming environments. 1) a user level that defines the base user-level instruction set, registers, data types, memory conventions, and the memory and programming models seen by application programmers and 2) a supervisor level that defines supervisor-level resources typically required by an operating system, i.e., the memory management model, supervisor level registers, and the exception model. However, one skilled in the art recognizes that a different global memory manager controller having the hereinto described elements and functionality of the MPC5668EG device could be used in place thereof.

Figure 3:
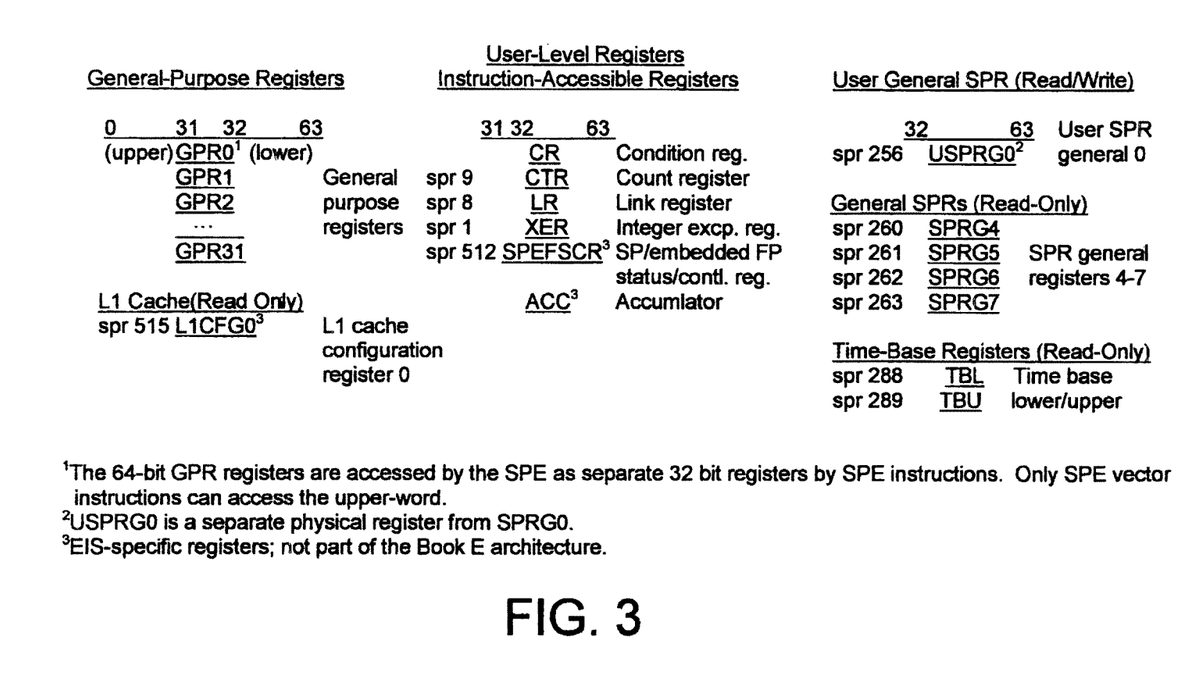
FIG. 3 is a listing of user-level and supervisor-level registers of an e200z6 core of the MPC5668EG processor of FIG. 2.

FIG. 3 shows the e200z6 core register set for the MPC5668EG controller, which indicates registers that are accessible in supervisor mode and those accessible in user mode. The MSR register of the e200z6 core of the MPC5668EG controller, which contains a "problem state" (PR) bit where a "0" indicates that the processor is in a supervisor mode, where any instruction can be executed, and any resource (for example, general purpose GPRs, supervisor purpose SPRs, machine status MSR registers) can be accessed. On the other hand, the "1" bit indicates that the processor is in a user mode, where no privileged instructions can be executed, and no access to any privileged resources is permitted.

Figure 4:
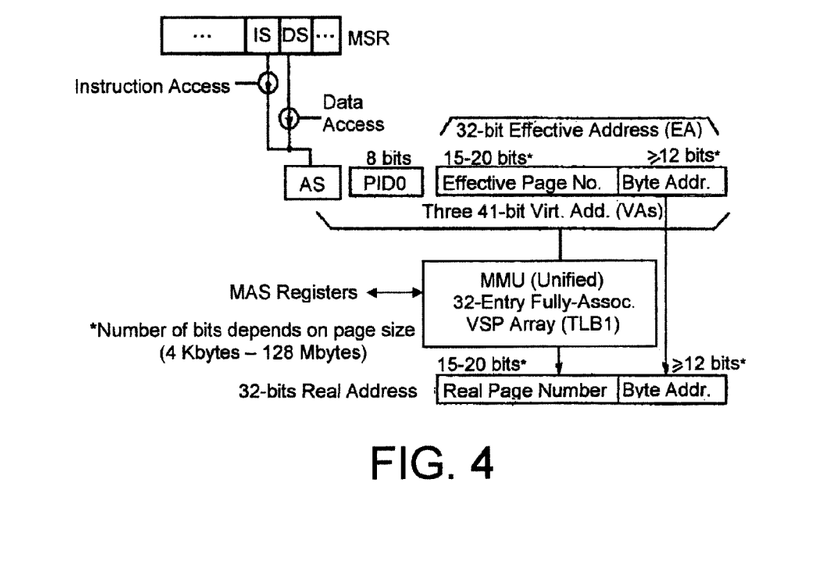
FIG. 4 is an effective address to real address translation flow diagram in accordance with the present invention.

The MMU, which is shown in the "Masters" block of the MPC5668EG processor in FIG. 2, is utilized in the present invention to achieve a clear separation between safety-related software and other QM software. To achieve this separation, several architectural choices have been made that impact the requirements for the MPC5668EG processor. The MPC5668EG processor utilizes the supervisor/user mode, MMU, dual RAM, and dual cores (e200z6 and e200z0), wherein the MPC5668EG provides an MMU with 32-bit effective addresses that are translated to 32-bit real addresses using a 41-bit interim virtual address (see FIG. 4), the MMU may only be available to the e200z6 core and not the e200z0 core, a PID (process identifier) is associated with each effective address (instruction or data), the e200z6 core implements a single PID register (called PID0), where several values for PID0 are defined herebelow.

Figure 5:
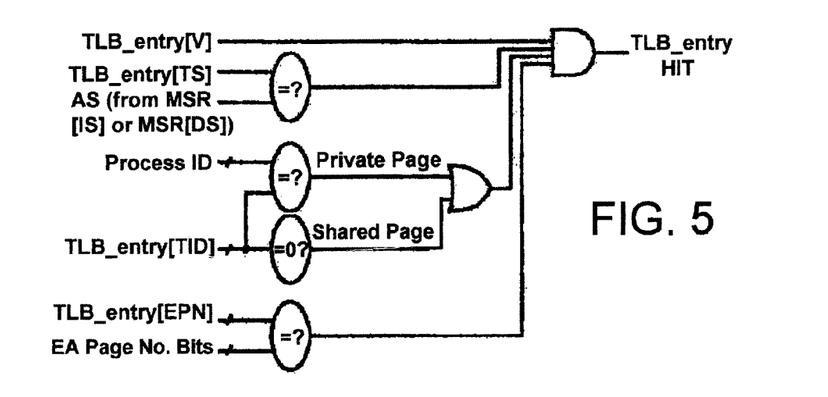
FIG. 5 is a virtual address and TLB entry compare process diagram in accordance with the present invention.
Figure 6:
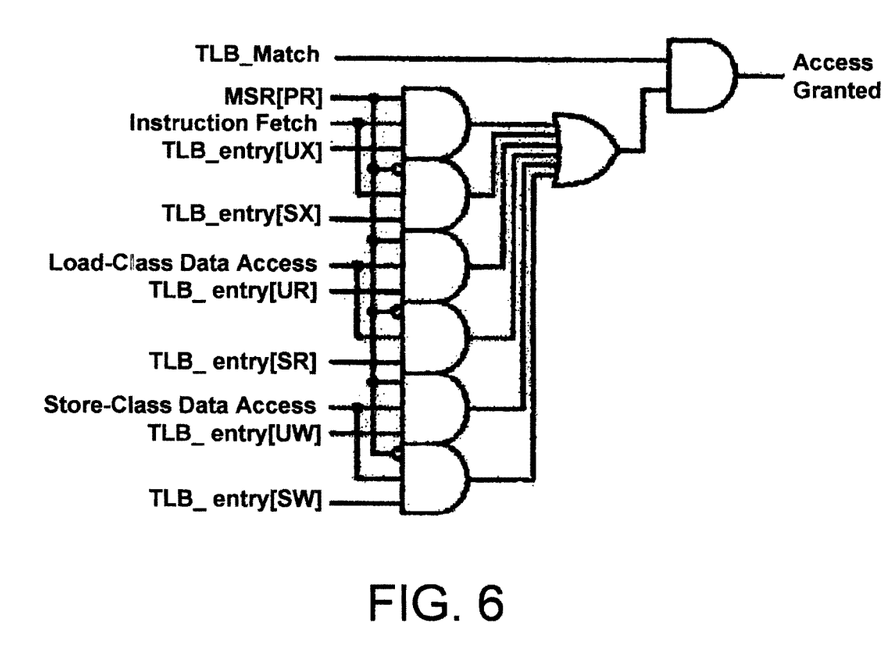
FIG. 6 is an MMU granting of access permissions diagram in accordance with the present invention.

Further, the translation is done based on TLB entries, specifically, if the PID value in the PID0 matches with a TLB entry in which all of the other criteria are met (see FIG. 6), then that entry will be used for translation. If the translation match was successful, then permission bits are checked. A hit to multiple TLB entries is considered to be a programming error (see FIG. 5), wherein, if this occurs, the TLB generates an invalid address and TLB entries may be corrupted (an exception will not be reported).

Figure 7:
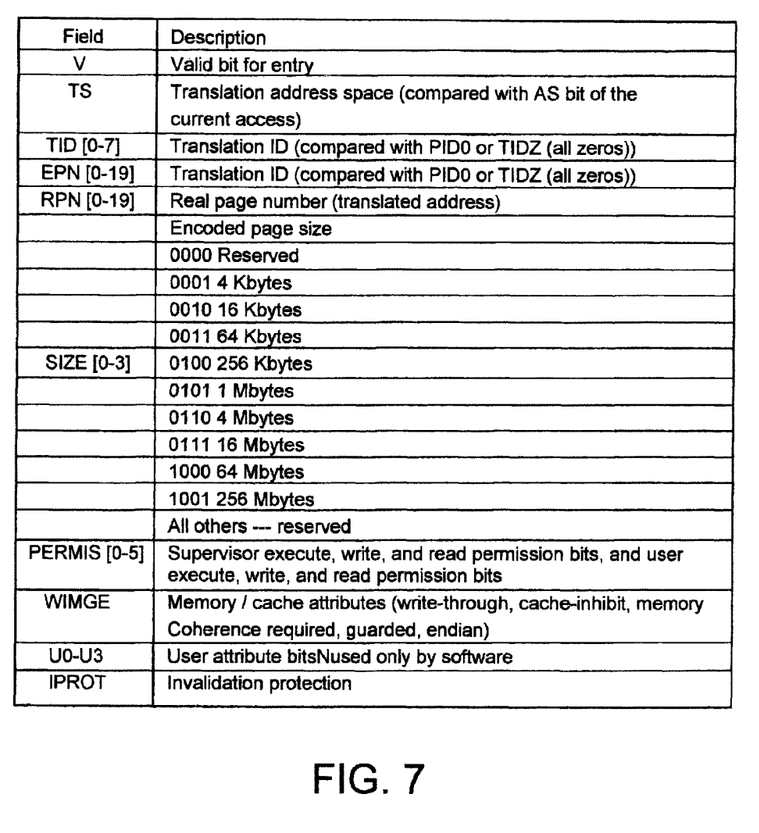
FIG. 7 is a TLB entry bit fields listing in accordance with the present invention.

Regarding the MMU configuration, the TLB entries need to be defined at initialization time. An example of a TLB entry is shown in the listing of FIG. 7. Also, the MPC5668EG has two SRAM units; one unit with 80 KB on board and a second unit with 512 KB on board, where both units are provided by the ECC. It is preferred that both SRAM units are to be used and that the ECC, along with both e200z6 core and e200z0 cores are to be supported.

An architectural overview of a second pattern is given in FIG. 8 where it is illustrated as a functional architecture that is in accordance with the present invention that uses the following principles. As indicated by the dashed vertical line separating the SW-S/A (sensors/actuators), SW-C (components), and a dRTE (Dana run time environment) module from the SG. The SW-S/A, SW-C, and dRTE modules are considered as developed according to QM standards. The OS, both BSP's, and SG modules are considered as developed according to SIL standards. Therefore, as in the first functional architectural pattern of FIG. 1, an SIL decomposition is used to make a split-off between a safety-related generic reusable software SW-S/A, SW-C and the safety-related application specific software SG, wherein these SW's and the SG have their own separate logical unit. Therefore, it is guaranteed that the SW's cannot interfere (such as write code, write memory, and/or write data) with the SG.

The second pattern architecture allows the SW-S/A, SW-C, and dRTE modules and OS, both BSP's, and SG modules to reside in the same memory space (code and data space), and on the same uC, without the S/A, SW-C, and dRTE modules being able to corrupt the OS, both BSP's, and SG modules.

For the second pattern, the SG runs on a separate (e200z0) core of the MCP5668EG, where the SW-C only communicates within itself by means of the dRTE. Further, the SW-S/A makes a link between the left BSP and the SW-C. Although the S/A, SW-C, and dRTE are running in supervisor mode (which is discussed in detail herebelow), the S/A, SW-C, and dRTE are shown separately in FIG. 8.

System requirements for the second pattern are to support both the user mode/supervisor mode features, wherein both cores e200z6 and e200z0 are supported, both SRAM units are given ECC support, and the MMU feature is supported. Also, architecture support is given to both the user mode/supervisor mode, both cores e200z6 and e200z0, the 80 KB SRAM and the 512 KB SRAM, both with ECC. The MMU in the MCP5668EG of the second pattern is integrated with Actia (Automotive Corporation of France) BSP modules.

Figure 9:
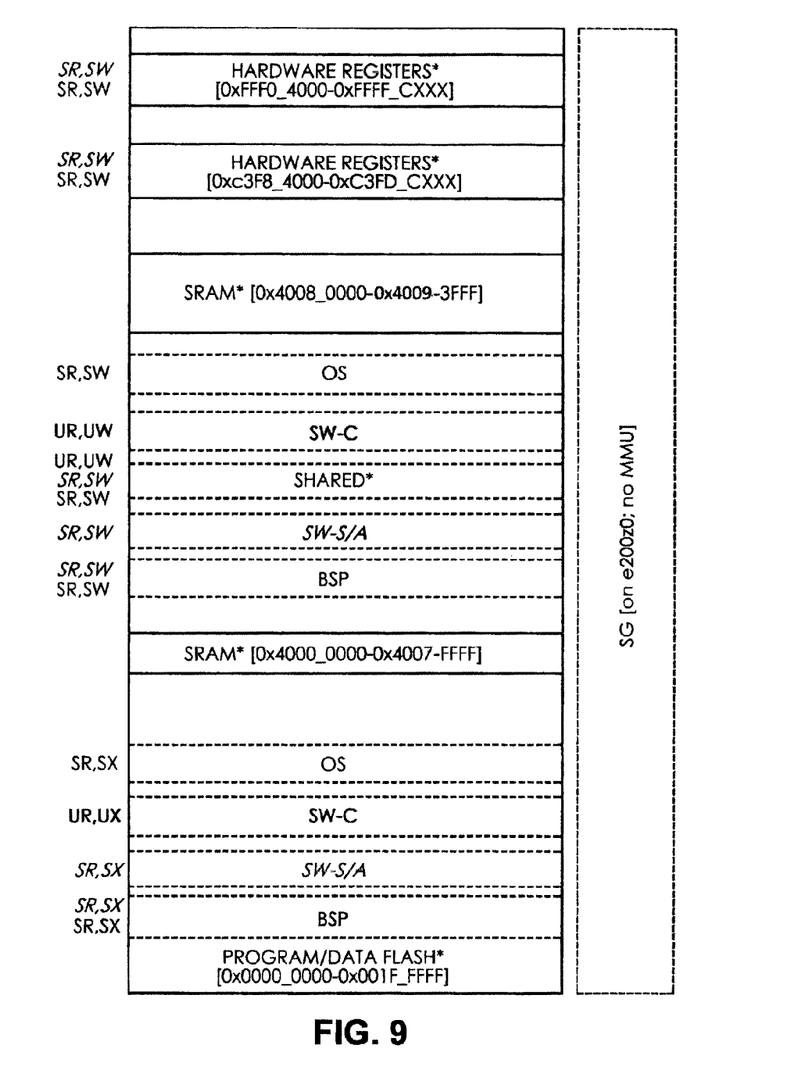
FIG. 9 is an architectural structure of memory addresses for SG on an e200z0 core in accordance with the present invention.

FIG. 9 illustrates the second pattern from a memory address space point-of-view where the following items are defined. The BSP is the driver code/memory, the OS is supplied by RTOS, SG is the safety-critical code/memory, SW-S/A is the sensor and actuator software components code/memory, SW-C module is the application software components.

OS interrupts run in supervisor mode, BSP interrupts run in supervisor mode, and the SW-S/A runs in supervisor mode, where the SW-S/A is the only software component(s) that may access BSP. Also, the SW-S/A may read and write the shared memory.

The SW-C runs in user mode but may not access BSP, nor read and write the shared memory. The SG runs in supervisor mode and may access BSP and may read the shared memory.

The second architectural concept of FIG. 9, taken from a memory address space point of view, has access rights to various memory address spaces, for the different modules. As shown down the left side of FIG. 9, the rights are defined as—SR: Supervisor read, SW: Supervisor write, SX: Supervisor execute, UR: User read, UW: User write, UX: User execute. These access rights for the different modules in FIG. 9, are as follows.

The following memory address spaces have SR,SX (shown in normal font orientation)—lower BSP and OS. The following memory address spaces have SR, SX (shown in italicized font orientation)—lower BSP and SW-S/A. The following memory address space has UR,UX (shown in bold font orientation)—lower SW-C. The following memory address spaces have SR,SW (shown in normal font orientation)—upper BSP, SHARED, OS, and both HARDWARE REGISTERS. The following memory address spaces have SR,SW (shown in italicized font orientation)—upper BSP, SW-S/A, SHARED, and both HARDWARE REGISTERS. The following memory address space has UR,UW (shown in bold font orientation)—upper SW-C and SHARED. SG has rights on the entire memory address space on the e200z0 core, with no MMU (shown in a dashed box on the right of the memory address space).

The memory address space of FIG. 9 is configured as a static configuration, and is based on a linker output. This provides the user flexibility to define the regions, rights and the corresponding sizes.

Only BSP configures the MMU, such that when a miss is detected by the MMU, the BSP makes sure that the controller resets. The OS will configure the user and supervisor mode for the SW-S/A and SW-C and the OS will set the corresponding PID.

The basic safety strategy plans are: 1) ASIL (ISO 26262) decomposition principle is used to make a split-off between safety-related generic re-usable software (while following the QM process of Dana dFLAME software) and safety-related application specific software (implementing specifically the safety goals for a specific application while following an SIL process in dFLAME. 2) The safety-related generic re-usable software is mapped onto the SW-C and SW-S/A modules. 3) The safety-related application specific software is mapped onto the SG module. 4) The SW-C and SW-S/A cannot corrupt the SG code space and memory space. 5) The ECC is used for all entities, for both code space and memory space. 6) The SW-C and SW-S/A run on the e200z6 core. 7) The SG runs on the e200z0 core. 8) The SW-C and SW-S/A use the 512 KB SRAM unit. 9) The SG uses the 80 KB SRAM unit. 10) Both cores monitor each other periodically. 11) BSP is developed according to SIL. The monitoring of both cores is also known as "controller monitoring" (for example, E-Gas monitoring concept for engine management systems of gasoline and diesel engines).

This type of monitoring is function (application) independent, by way of question-answer algorithms.

Consequently, SG implements the safety goals in an application-specific way where two levels are defined: 1) Outputs are directly correlated to inputs and checked for safe behavior. 2) Function monitoring where Intermediate results in the SW-C and SW-S/A are checked for safe behavior.

Safety-related data that comes over CAN (e.g. engine speed) must be both available for the SW-S/A and SG. The callback of the CAN is to be developed according to SIL and specifically route safety related data to SG.

BSP is to be able to support both calls from SW-S/A and SG.

Consequently, the advantages of the instant invention are that the design and validation are only required of a small part of the functional safety related application according to SIL. The major parts of the functional safety related application are achieved according to QM levels and non-safety related applications are integrated with safety related applications. The design for all applications (safety related or not) is achieved by way of generic hardware/software. Hence, major parts of functional safety related applications are upgraded without re-certification. Thereby, saving an entity much time and labor costs.

In accordance with the provisions of the patent statutes, the present invention has been described in what is considered to represent its preferred embodiments. However, it should be noted that the invention can be practiced otherwise than as specifically illustrated and described without departing from its spirit or scope.

The invention claimed is:

1. A process for separating automotive safety from standard functional software, comprising the steps of:
providing a first software module (SW) associated with a first logical unit, the first software module operative within a first processing environment equipped with its own memory and processor capability ($\mu C1$);
instructing the first software module to implement a first safety goal based on quality management ,(QM) levels, wherein design and validation of major parts of the functional safety related application are achieved according to quality management levels:
wherein implementing a first safety goal by the first software module includes safety-related generic reusable software;
providing a second software module (SG) associated with a second logical unit, the second software module operative within a second processing environment equipped with its own memory and processor capability ($\mu C2$), the second processing environment being application specific and separate from the first processing environment; and
instructing the second software module to implement a second safety goal based on a safety integrity level (SIL) associated with standards for functional safety related applications, wherein implementing the second safety goal by the second software module includes safety-related application specific software;
using, by the second software module, at least one input and at least one output of its own logical unit to determine if intended safety goals are in accordance with generic quality management safety or if safety integrity level goals are satisfied, including checking if the first software module logical unit works properly by using a question-answer algorithm, the second software module also using a result of the first software module to determine if the safety-related goals provided by the first software module implementing safety check in accordance to the first safety goal have been satisfied;

wherein cross-operational use of both the first software and the second software modules guarantees that the first software module cannot interfere with write code, write memory, and/or write data associated with the second software module, and the functional safety related application does not have to be recertified, so as to save much time and labor costs.

2. The process for separating automotive safety from standard functional of claim 1, further comprising the steps of:

providing a third software module (SW-C) that is a safety-related generic reusable component software module associated with the first logical unit, wherein the first software module comprises a safety-related generic reusable sensor/actuator software module (SW-S/A);

instructing the first software module and third software module to implement the first safety goal according to a quality management level; and instructing the second software module to implement the second safety goal according to a safety integrity level, wherein the second software module uses a result of the first and third software modules to determine if the first safety goal has been satisfied.

* * * * *

UNITED STATES PATENT AND TRADEMARK OFFICE
CERTIFICATE OF CORRECTION

| | |
|---|---|
| PATENT NO. | : 9,235,727 B2 |
| APPLICATION NO. | : 13/261967 |
| DATED | : January 12, 2016 |
| INVENTOR(S) | : Christophe Thomas, Steven Dumoulin and Bjorn Acelvoet |

It is certified that error appears in the above-identified patent and that said Letters Patent is hereby corrected as shown below:

ON THE TITLE PAGE:

Item (71): The Applicant's city reads Sint-Michiels, which is incorrect. The city should read Brugge.

Item (73): The Assignee's city reads Bruges, which is incorrect. The city should read Brugge.

Signed and Sealed this
Twenty-sixth Day of July, 2016

Michelle K. Lee
*Director of the United States Patent and Trademark Office*